(12) United States Patent
Nakatani

(10) Patent No.: US 7,755,982 B2
(45) Date of Patent: Jul. 13, 2010

(54) OPTICAL DISC DEVICE

(75) Inventor: Morio Nakatani, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 773 days.

(21) Appl. No.: 11/445,233

(22) Filed: Jun. 2, 2006

(65) Prior Publication Data
US 2006/0274627 A1 Dec. 7, 2006

(30) Foreign Application Priority Data
Jun. 3, 2005 (JP) .............................. 2005-164564

(51) Int. Cl.
*G11B 7/00* (2006.01)
(52) U.S. Cl. .............. 369/30.04; 369/30.25; 369/47.55; 369/59.25; 369/94; 369/275.3
(58) Field of Classification Search ........................ None
See application file for complete search history.

(56) References Cited

U.S. PATENT DOCUMENTS

| 6,141,299 | A * | 10/2000 | Utsumi ..................... 369/53.37 |
| 2005/0013216 | A1* | 1/2005 | Kim et al. .................. 369/47.5 |
| 2005/0111334 | A1* | 5/2005 | Cookson et al. ............... 369/94 |
| 2005/0226116 | A1* | 10/2005 | Kubo et al. ............... 369/47.53 |

FOREIGN PATENT DOCUMENTS

| JP | 06-162512 | 6/1994 |
| JP | 09-509776 | 9/1997 |
| JP | 2003-346348 | 12/2003 |
| WO | WO 96/19807 | 6/1996 |

OTHER PUBLICATIONS

Machine translation of JP2002-216391 into english, Suzuki.*
Japanese Office Action, with English translation, issued in Japanese Patent Application No. JP 2005-164564, mailed Oct. 21, 2008.
Japanese Decision of Final Rejection, with English translation, issued in Japanese Patent Application No. 2005-164564, mailed Apr. 7, 2009.

* cited by examiner

*Primary Examiner*—Wayne R Young
*Assistant Examiner*—Brian Butcher
(74) *Attorney, Agent, or Firm*—McDermott Will & Emery LLP

(57) ABSTRACT

When a hybrid type next-generation DVD is loaded in the optical disc device, first, a red laser is turned on and parameter value and a lead-in information with respect to a DVD layer are acquired. The acquired information is stored in a memory. Next, a blue laser is turned on, parameter value and a lead-in information to a HDDVD layer are acquired, and the acquired information is stored in a memory. Then, the HDDVD layer is reproduced while lighting of the blue laser beam is maintained. Then, when a jump instruction to the DVD layer is inputted, the parameter value for the DVD layer is read from the memory and set to a process system. And the lighting laser is changed to the red laser and reproduction of the DVD layer is performed based on the lead-in information of the DVD layer stored in the memory.

4 Claims, 4 Drawing Sheets

OPTICAL DISC DEVICE

This application claims priority under 35 U.S.C. Section 119 of Japanese Patent Application No. 2005-164564 filed Jun. 3, 2005.

BACKGROUND OF THE INVENTION

1. Field of the Invention

The present invention relates to an optical disc device capable of reproducing a hybrid type optical disc having two or more recording layer corresponding to laser beams of different wavelengths in a laminating direction.

2. Description of the Related Art

Presently, standardization of the next-generation DVD (Digital Versatile Disc) using a blue laser beam having a wavelength of about 405 nm is being forwarded. In such standardization, consideration is made on arranging two recording layers, the recording layer (hence forth a HDDVD layer) corresponding to a blue laser beam and the recording layer (henceforth a DVD layer) corresponding to a red laser beam, in a laminating direction. The recording layer of three or more layers may be arranged.

Japanese Laid-Open Patent Publication No. 2003-346348 discloses an optical disc including two recording layers and a driving device thereof.

In the hybrid type next-generation DVD, the lead-in information is individually recorded on each recording layer. Thus, when performing an operation to each recording layer, it is necessary to acquire a lead-in information individually for every recording layer.

However, when a jump is performed to other recording layers from a certain recording layer, if the lead-in information corresponding to the recording layer after the jump is acquired at the time of jump operation, time will be spent on such acquisition processing and quick processing operation will be injured. When the worst, the series property of the stream operation following the recording layer after the jump from the recording layer before the jump may break off.

SUMMARY OF THE INVENTION

The present invention aims to provide the optical disc device which can perform quickly the layer jump operation for such kind of hybrid type optical disc.

A first aspect of the present invention relates to an optical disc device capable of reproducing a hybrid type optical disc having two or more recording layers corresponding to laser beams of different wavelengths in laminating direction, the optical disc device includes a lead-in acquisition means for acquiring a lead-in information, before a jump from a first recording layer to a second recording layer among the recording layers, of the second recording layer; and a memory means for storing the lead-in information acquired by the lead-in acquisition means.

According to a second aspect of present invention, in the optical disc device according to the first aspect, the lead-in acquisition means performs the acquisition processing of the lead-in information to all recording layers other than a recording layer to which a reproduction operation is performed first, after the hybrid type optical disc is loaded to the optical disc device until the first reproduction operation to the hybrid type optical disc is started.

According to a third aspect of present invention, in the optical disc device according to the first aspect, the lead-in acquisition means monitors, while operation to a certain recording layer is performed among the recording layers, whether free time arises in the operation and performs the acquisition processing of the lead-in information to other recording layers other than the recording layer to which the operation is performed when the free time arises.

According to a fourth aspect of present invention, the optical disc device according to any one of the first, second and third aspect, further includes a parameter acquisition means for acquiring, when acquiring the lead-in information by the lead-in acquisition means, predetermined parameter value required for processing to the second recording layer with irradiating the laser beam of the wavelength corresponding to the second recording layer and storing the parameter value obtained in the memory means, and a parameter setting means for reading out the parameter value for the second recording layer from the memory means and setting the parameter value read out to a process system when jumping from the first recording layer to second recording layer.

According to the optical disc device in these aspects of the present invention, before the jump to other recording layers, the lead-in information corresponding to the recording layer after the jump is acquired and stored in the memory means. And the lead-in information stored in the memory means is referred to at the time of the jump. Therefore, according to the optical disc device in these aspects, it is not necessary to perform the acquisition processing of the lead-in information with respect to the recording layer after the jump at the time of a jump. Therefore, operation after the jump can be quickly performed at the time of the jump. Thus, smooth operation may be realized since the series property of a stream operation is not break off at the time of the layer jump.

According to the optical disc device in the second aspect of the present invention, the lead-in information to all the recording layers other than the recording layer to which first processing is performed is beforehand stored in the memory means. Thus, when jumping to every recording layer, corresponding lead-in information may be acquired from a memory means. Therefore, when jumping to every recording layer, speeding up of processing can be attained.

According to the optical disc device in the third aspect of the present invention, when free time arises in operation to a certain recording layer, the acquisition processing of the lead-in information to other recording layers other than the recording layer is performed using the free time. Thus, the increase in efficiency of the lead-in information acquisition processing to each recording layer can be attained.

According to the optical disc device in the fourth aspect of the present invention, at the time of acquisition of the lead-in information, the parameter value corresponding to the recording layer after the jump besides the lead-in information is acquired, and the parameter value and the lead-in information are stored in the memory means. And at the time of the jump, the parameter value stored in the memory means is read from the memory means, and it is set to the process system. Therefore, according to the optical disc device in the fourth aspect of the present invention, at the time of the jump, the acquisition processing of the parameter to the recording layer after the jump can also be omitted, and operation after the jump can be made to quicken further.

Processing in the lead-in acquisition means in the above aspects of the present invention is performed by controlling a servo circuit 103 and a laser drive circuit 104 by a controller 106 in the following embodiment. The memory means in the above aspects of the present invention is embodied by a memory 108 in the following embodiment. Processing in the parameter acquisition means in the above aspects of the present invention is performed by controlling a servo circuit 103, a laser drive circuit 104 and a demodulation circuit 105 by a controller 106 in the following embodiment. Processing in the parameter setting means in the above aspects of the present invention is performed by controller 106 in the following embodiment.

BRIEF DESCRIPTION OF THE DRAWINGS

The present invention, together with objects and advantages thereof, may best be understood by reference to the following description of the presently preferred embodiments together with the accompanying drawings in which.

It should be noted that the drawings are merely provided for explanation purpose and should not be considered as limiting the scope of the invention in any way.

DESCRIPTION OF THE PREFERRED EMBODIMENTS

The embodiments of the present invention will now be described with reference to the drawings.

In the present embodiment, the present invention is applied to a compatible optical disc device that can respond to an existing DVD and a next-generation DVD in addition to the above described hybrid type next-generation DVD in which one DVD layer and one HDDVD layer are arranged in the thickness direction.

Figure 1:
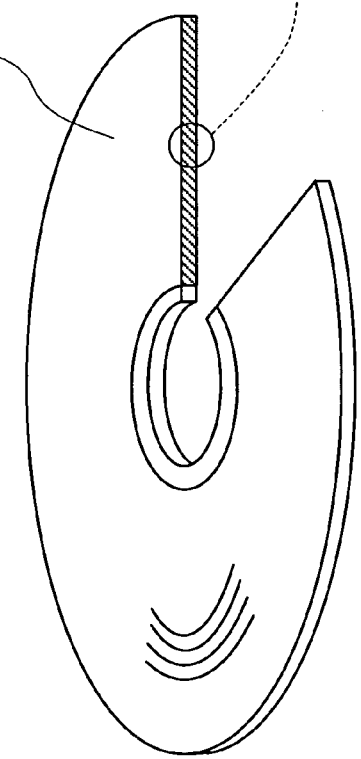
FIG. 1 shows a configuration of an optical disc according to the embodiment of the present invention.
Figure 1:
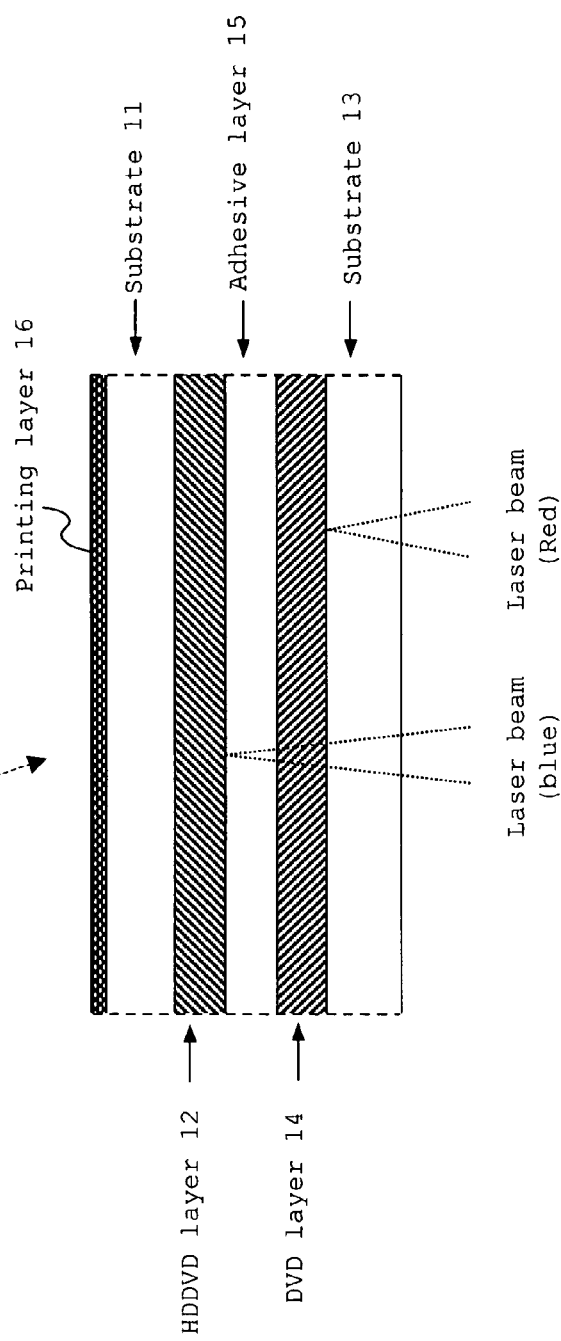

FIG. 1 shows a configuration of the hybrid type next-generation DVD (read only type).

The hybrid type next-generation 1 has a configuration in which a substrate 11 formed with the HDDVD layer (first recording layer) 12 on one surface and a substrate 13 formed with the DVD layer (second recording layer) 14 on one surface are laminated by an adhesive layer 15, and a printing layer 16 is formed on the other surface of the substrate 11. The laser light enters from the substrate 13 side. The pit sequence is spirally formed in HDDVD layer 12 and DVD layer 14.

The data format of the DVD layer 14 is the same as the data format of the existing DVD. Information indicating the presence of the HDDVD layer 12 is not contained in the lead-in information of the DVD layer 14. The DVD layer 14 transmits and reflects the blue laser light having a wavelength of about 405 nm and a red laser light having a wavelength of about 655 nm, respectively, at a defined ratio.

The data format complying with the next generation DVD standard is applied to the HDDVD layer 12. Information indicating the presence of the DVD layer 14 is also not contained in the lead-in information of the HDDVD layer 12. The HDDVD layer 14 is formed by a material that reflects the blue laser light at a defined reflectance, but substantially transmits all the red laser lights.

Figure 2:
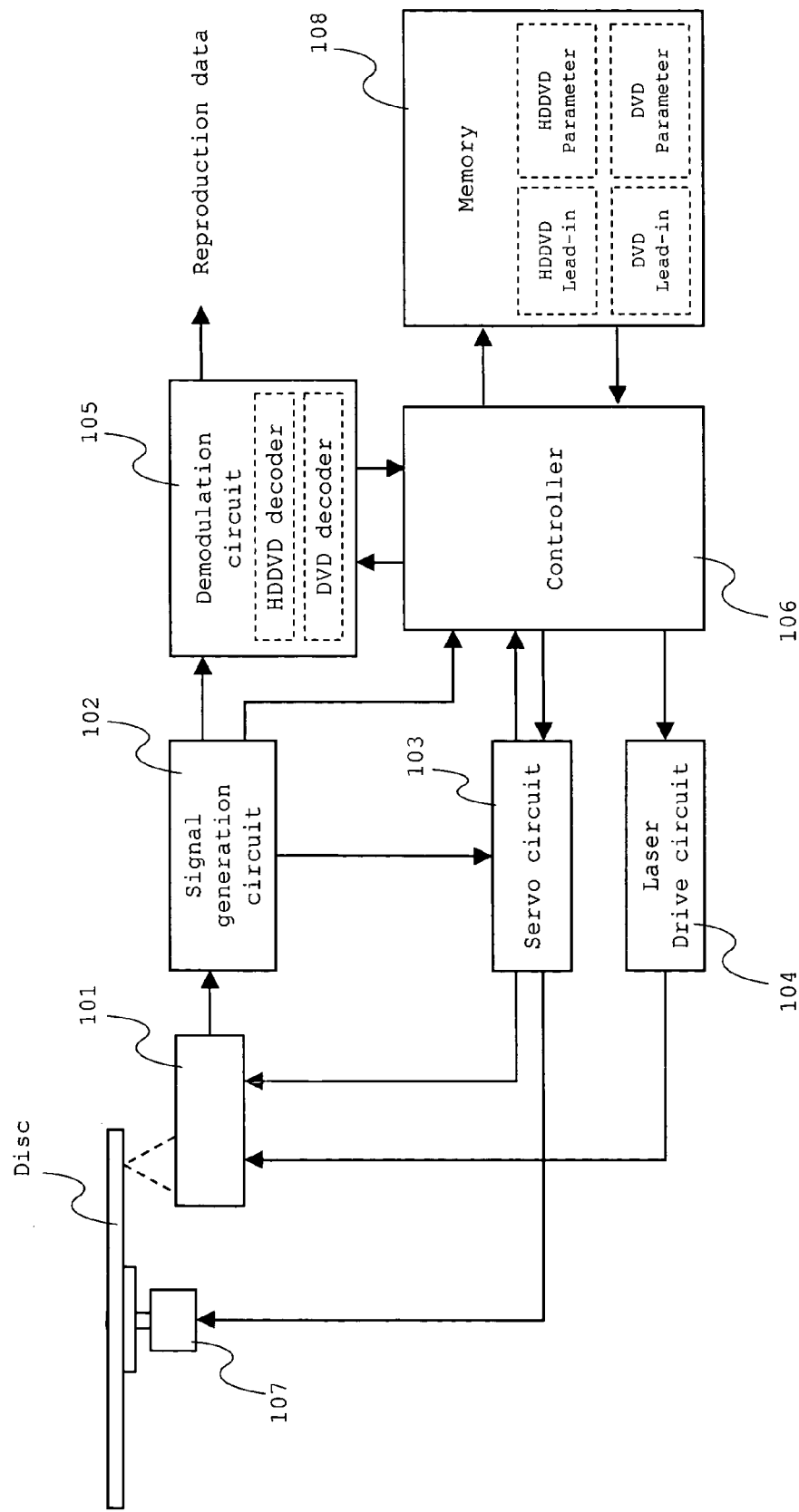
FIG. 2 a configuration of an optical disc device according to the embodiment of the present invention.

FIG. 2 shows a configuration of the optical disc device according to the present embodiment. It should be recognized that only the blocks associated with the reproduction system are shown in the figure.

The optical disc device is provided with an optical pickup 101, a signal generation circuit 102, a servo circuit 103, a laser drive circuit 104, a demodulation circuit 105, a controller 106, a spindle motor 107, and a memory 108.

The optical pickup 101 includes a semiconductor laser for exiting the blue laser light having a wavelength of about 405 nm and a red laser light having a wavelength of about 655 nm, an objective lens for converging the laser light onto the disc, an objective lens actuator for driving the objective lens in a focusing direction and a tracking direction, a photodetector for receiving the reflected light from the disc, and an optical system for guiding the laser light from the semiconductor laser to the objective lens and for guiding the reflected light from the disc to the photodetector.

The signal generation circuit 102 performs calculation process on the signal from the photodetector arranged in the optical pickup 101, generates various signals such as RF signal, focus error signal, tracking error signal and the like and outputs the signals to the corresponding circuits.

The servo circuit 103 generates a focus servo signal and a tracking servo signal based on the signal input from the signal generation circuit 102, and outputs such signals to the objective lens actuator of the optical pickup 101. The servo circuit 103 also generates a motor servo signal based on the signal input from the signal generation circuit 102 and outputs such signal to the spindle motor 107.

The servo circuit 103 acquires the parameter value (gain value and offset value of the focus servo signal and the tracking servo signal, etc.) of a servo system based on the signal inputted from signal generation circuit 102, and sets the acquired value up as parameter value to the disc loaded. Simultaneously, the acquired parameter value is outputted to the controller 106. The controller 106 stores the inputted parameter value in the memory 108.

The laser drive circuit 104 outputs a drive signal to the semiconductor laser in the optical pickup 101 based on the control signal input from the controller 106. The light emission of the blue laser light and the light emission of the red laser light are appropriately switched according to such control.

The demodulation circuit 105 demodulates the RF signal input from the signal generation circuit 102, generates the reproducing data and outputs the data to a subsequent circuit. The demodulation circuit 105 includes a demodulating section (DVD decoder) for performing data demodulation according to the DVD data format and a demodulation section (HDDVD decoder) for performing data demodulation according to the next generation DVD data format. Which demodulating section to use is set based on the control signal from the controller 106.

Each demodulation section of the demodulation circuit 105 acquires a parameter value (gain value and offset value of a RF signal, etc.) of a demodularion system based on the RF signal inputted from the signal generation circuit 102, and sets the acquired value up as parameter value to the disc loaded. Simultaneously, the acquired parameter value is outputted to the controller 106. The controller 106 stores the inputted parameter value in the memory 108.

The controller 106 controls each part according to the program set up beforehand while storing various data in the memory 108.

Figure 3:
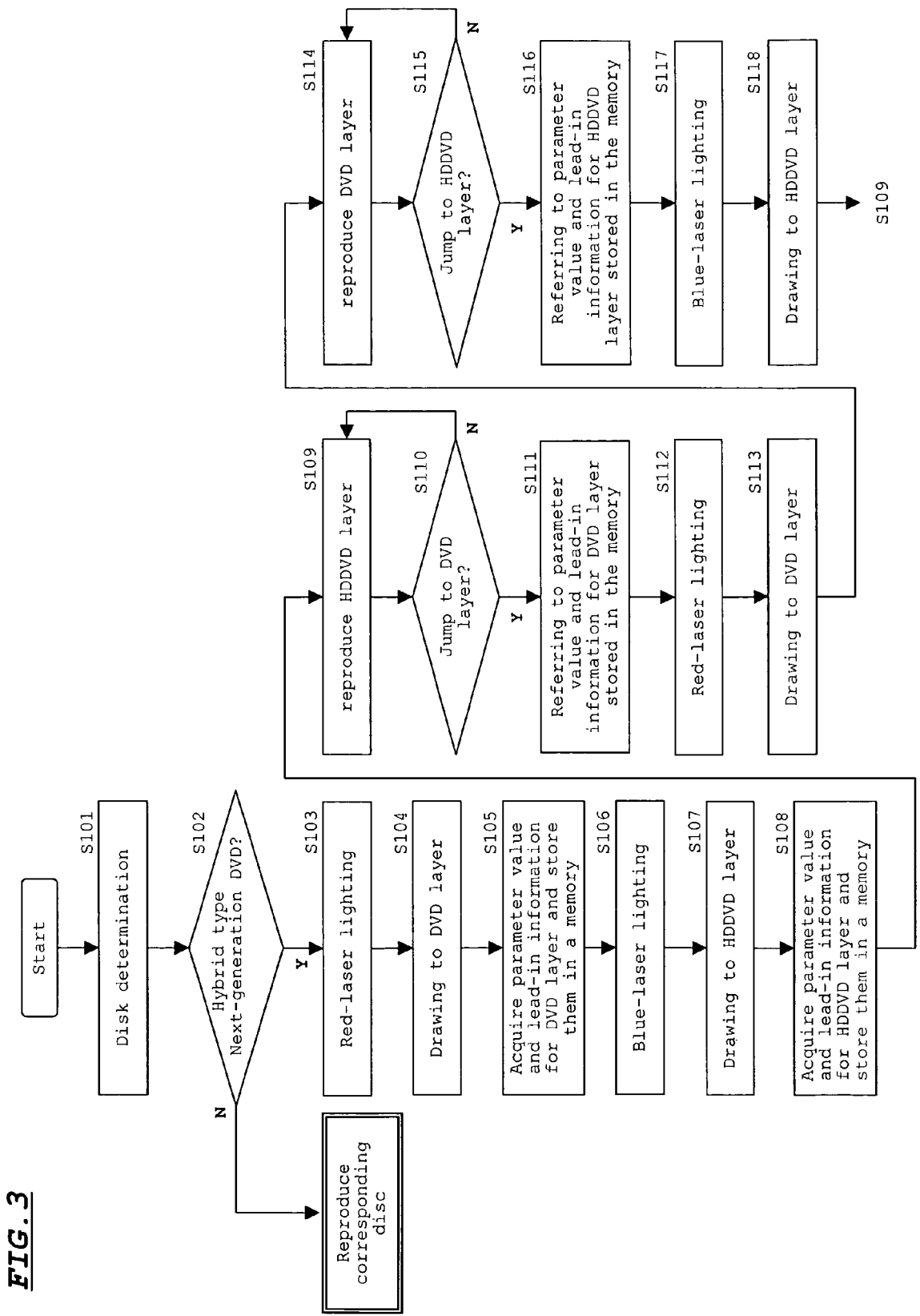
FIG. 3 is a process flowchart in disc reproduction according to the embodiment of the present invention.

FIG. 3 shows a process flow chart in disk reproduction.

When process starts, disc determination to the disc loaded is first performed (S101). For example, the disc determination is performed such that drawing operation to each layer and distinction of whether reading to each layer is possible or not are performed while irradiating the red laser beam and the blue laser beam one by one to the disc then the number of layers of DVD layer and HDDVD layer contained in the disc loaded is detected from the distinction result.

When it is determined in the disc determination that the disc loaded is not hybrid type next-generation DVD (S102: N), the reproduction processing of the disc according to the determination result is performed. On the other hand, when it is determined that the disc loaded is hybrid type next-generation DVD (S102:Y), first, the red laser is turned on (S103) and the drawing operation to DVD layer 14 is performed (S104). In the drawing operation, the parameter value (gain value and offset value of a focus servo signal and a tracking servo signal, etc.) of the servo system and the parameter value (gain-value and offset value of RF signal, etc.) of the demodularion system with respect to the DVD layer 14 are acquired, and these parameter value are stored in the DVD parameter storing field in the memory 108. Further, the lead-in information of DVD layer 14 is read and the read information is stored in the DVD lead-in storing field in the memory 108 (S105).

When the parameter value and the lead-in information with respect to the DVD layer 14 are stored in the memory 108 according to the above process, the lighting laser is changed from the red laser to the blue laser (S106), and the drawing operation to the HDDVD layer 12 is performed (S107). In the drawing operation, the parameter value (gain value and offset value of a focus servo signal and a tracking servo signal, etc.) of the servo system and the parameter value (gain-value and offset value of RF signal, etc.) of the demodulation system with respect to the HDDVD layer 12 are acquired, and these parameter values are set to the servo circuit 103 and the HDDVD decoder of the demodulation circuit 105. Simultaneously, these parameter values are stored in the HDDVD parameter storing field in the memory 108. Further, the lead-in information of HDDVD layer 12 is read and the read information is stored in the DVD lead-in storing field in the memory 108 (S108). Then, according to a reproduction instruction, the reproduction process to HDDVD layer 12 is started (S109).

After that, the reproduction operation to the HDDVD layer 12 is continued until a reproduction close instruction or a jump instruction to DVD layer 14 occurs.

Then, when a jump instruction to DVD layer 14 occurs (S110:Y), the parameter value with respect to the DVD layer acquired in S105 is read from the memory 108, and is set to the servo circuit 103 and the DVD decoder of the demodulation circuit 105. The lead-in information of the DVD layer stored in the memory 108 in S105 is referred to (S111). And the lighting laser is changed from the blue laser to the red laser (S112), and the drawing operation to the DVD layer 14 is performed (S113). When the drawing to the DVD layer 14 is completed, the reproduction processing according to an instruction is started based on the lead-in information referred to in S111 (S114).

After that, the reproduction operation to DVD layer 14 is continued until a reproduction close instruction or a jump instruction to the HDDVD layer 12 occurs.

Then, again, when a jump instruction to HDDVD layer 12 occurs (S115:Y), the parameter value to HDDVD layer 12 acquired in S108 is read from the memory 108, and is set to the servo circuit 103 and the HDDVD decoder of the demodulation circuit 105. The lead-in information of the HDDVD layer stored in the memory in S108 is referred to (S116). And after the lighting laser is changed from the red laser to the blue laser (S117), the drawing operation to the HDDVD layer 12 is performed (S118). When the drawing to the HDDVD layer 12 is completed, the reproduction process according to an instruction is started based on the lead-in information referred to in S116 (S109).

Hereafter, a reproduction operation is performed similarly, jumping between HDDVD layer 12 and DVD layer 14 mutually. And, when a reproduction close instruction occurs, a reproduction operation is ended. The parameter value and the lead-in information stored in the memory 108 are held in the memory 108 until the disc is ejected.

According to the present embodiment, since the parameter value and the lead-in information to the DVD layer 14 are beforehand stored in the memory 108, it is not necessary to perform the acquisition process of the lead-in information and the parameter value with respect to the DVD layer 14 when the jump to the DVD layer 12 from the HDDVD layer 12. Therefore, jump operation to the DVD layer 12 from the HDDVD layer 12 can be performed quickly.

The processing flow chart of FIG. 3 is applied when priority is given to the reproduction process to HDDVD layer 12 over the process to DVD layer 14. That is, this flow chart is applied in case that the reproduction process of HDDVD layer 12 is performed first when the hybrid type next-generation DVD is loaded and the DVD layer 14 is reproduced according to a subsequent jump instruction. When priority is given to the reproduction process to the DVD layer 14 over the process to the HDDVD layer 12 and it performs it, process of each step of FIG. 3 is changed so that the process to the HDDVD layer 12 and the process to the DVD layer 14 may be replaced mutually.

In the process flow chart of FIG. 3, the acquisition and storing process of a lead-in information and parameter value with respect to the DVD layer 14 (S103-S105) is performed in advance of the reproduction operation (S109) to the HDDVD layer 12. However, the reproduction operation to the HDDVD layer 12 may be performed without performing the acquisition and storing processing of parameter value and the lead-in information with respect to the DVD layer 14. In this case, the acquisition and storing processing of parameter value and a lead-in information with respect to the DVD layer 14 is performed using the free time (intermittent standby time occurring when the buffer memory to buffer the reproduction data is saturated with data, etc.) of the reproduction process to HDDVD layer 12.

Figure 4:
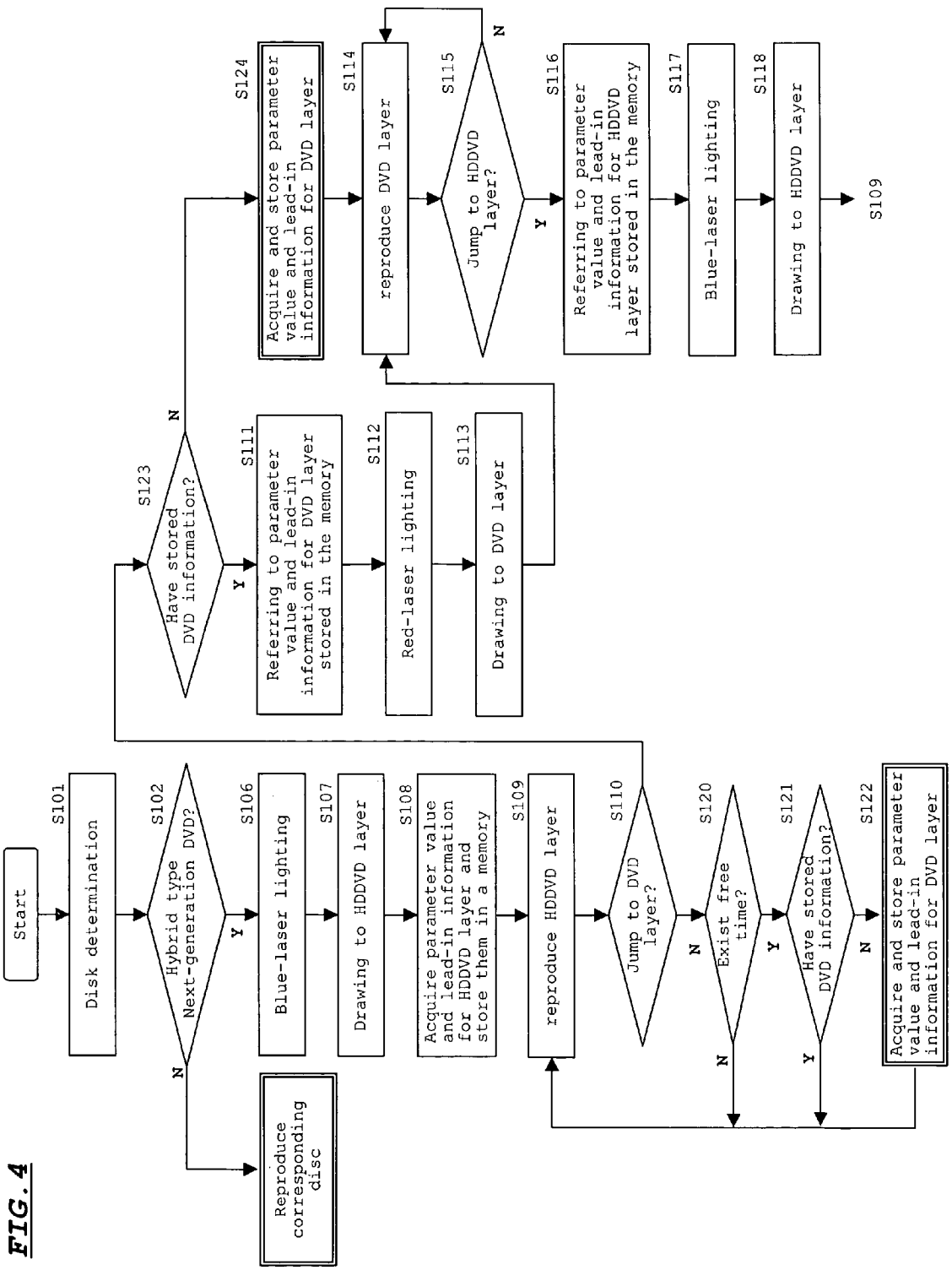
FIG. 4 is a variant of the process flowchart in disc reproduction according to the embodiment of the present invention.

The process flow chart in this case is shown in FIG. 4.

In this process flow chart, compared with FIG. 3, S103-S105 are deleted and the process step of S120-S124 is added instead. Other process steps are the same as that of the case of FIG. 3.

When it is determined in S102 that the disc loaded is hybrid type next-generation DVD, the blue laser is turned on (S106) and the drawing operation to the HDDVD layer 12 is performed (S107). In the drawing operation, the parameter value (gain value and offset value of a focus servo signal and a tracking servo signal, etc.) of the servo system and the parameter value (gain-value and offset value of RF signal, etc.) of the demodulation system with respect to the HDDVD layer 12 are acquired, and these parameter values are set to the servo circuit and the HDDVD decoder of the demodulation circuit 105. Simultaneously, these parameter values are stored in the HDDVD parameter storing field in the memory 108. Further, the lead-in information of the HDDVD layer 12 is read and the read information is stored in the memory 108 (S108). Then, according to a reproduction instruction, the reproduction process to the HDDVD layer 12 is started (S109).

After that, the reproduction operation to the HDDVD layer 12 is continued until a reproduction close instruction or a jump instruction to the DVD layer 14 occurs (S110:Y). While performing the reproduction operation to the HDDVD layer 12, it is distinguished whether free time arises in the reproduction operation to the HDDVD layer 12 (S120). Free time arises (S120:Y), it is distinguished whether the acquisition and storing process of parameter value and a lead-in information with respect to the DVD layer 14 are completed (S121). And when this process is not completed (S121:N), the lighting laser is changed from the blue laser to the red laser, and the acquisition and storing processing of parameter value and a lead-in information with respect to the DVD layer 14 are performed (S122). This process is performed like S103-S105 of FIG. 3. After completing the acquisition and storing processing of the parameter value and the lead-in information with respect to the DVD layer 14, again, the lighting laser is changed from the red laser to the blue laser, and process is returned to the reproduction operation of HDDVD layer 12 (S109).

When the jump instruction to the DVD layer 14 occurs during the reproduction operation to the HDDVD layer 12 (S110:Y), it is distinguished whether the acquisition and storing processing of parameter value and a lead-in information to the DVD layer 14 are completed (S123). When this process is not completed (S123:N), after the lighting laser is changed from the blue laser to the red laser, the acquisition and storing processing of the parameter value and the lead-in information with respect to the DVD layer 14 are performed (S124). This process is performed like S103-S105 of FIG. 3. After performing the acquisition and storing process of the parameter value and the lead-in information with respect to the DVD layer 14, the reproduction operation of the DVD layer 14 according to a reproduction instruction is started (S114).

When the acquisition and storing processing of the parameter value and the lead-in information with respect to the DVD layer 14 are completed at the time of the jump instruction to the DVD layer 14 (S123:Y), like as the case of FIG. 3, the parameter value for the DVD layer is read from the memory 108, and is set to the servo circuit 103 and the DVD decoder of the demodulation circuit 105. The lead-in information stored in the memory 108 is referred to (S111). And the lighting laser is changed from the blue laser to the red laser (S112), and the drawing operation to the DVD layer 14 is performed (S113). When the drawing to the DVD layer 14 is completed, the reproduction process according to an instruction is started based on the lead-in information referred to in S111 (S114).

Hereafter, a reproduction operation is performed like as the case of FIG. 3, jumping between the DVD layer 14 and the HDDVD layer 12 mutually. And a reproduction operation is ended when a reproduction close instruction occurs. The parameter value and the lead-in information stored in the memory 108 are held in the memory 108 until the disc is ejected.

According to the process flow chart of FIG. 4, since the acquisition and storing process of parameter value and a lead-in information to the DVD layer 14 are not performed in advance of the reproduction operation to the HDDVD layer 12, the time required by the playback start of HDDVD layer 12 from disc loading can be shortened. Since the acquisition and storing processing of the parameter value and the lead-in information with respect to the DVD layer 14 are performed using the free time of the reproduction operation to the HDDVD layer 12, the acquisition and storing processing of the parameter value with respect to the DVD layer 14 can be performed smoothly, without giving trouble to the reproduction operation to HDDVD layer 12.

However, according to the process flow chart of FIG. 4, when there is not sufficient free time to perform the acquisition and storing process of parameter value and a lead-in information with respect to the DVD layer 14 until the timing of first jump to the DVD layer 14, the acquisition and storing process of the parameter value and the lead-in information with respect to the DVD layer 14 should be performed at the time of the first jump to the DVD layer 14. In this case, compared with the case of FIG. 3, the time from the jump to the reproduction start becomes long by the time which the acquisition and storing process take.

Although the embodiment of the present invention is described above, the present invention is not limited to the above embodiment. Also, various changes besides the above are possible for the embodiment of the present invention.

For example, although parameter value stored in the memory 108 is used as it is at the time of reproduction of each layer in the above embodiment, proper parameter value may be acquired and set up by subsequent correction process by using the parameter value stored in the memory 108 as an initial value of the parameter when reproduction of each layer.

Although an acquisition position of parameter value on the disc is not explained in the above embodiment, it is preferred to set the acquisition position of the parameter value near the lead-in since acquisition of the lead-in information is performed following the acquisition process of parameter value. However, the acquisition position of the parameter value is not limited to this. Further, it is also possible to acquire parameter value in several positions on the diameter of the disc and store them in the memory. The parameter value acquired in the position nearest to a position after a jump is used at the time of reproduction. In this case, gap between the parameter value set up and the optimal value of the parameter in the position after the jump can be suppressed.

The above embodiment shows the optical disc device reproducing the hybrid type disc having one HDDVD layer and one DVD layer. However, the present invention can be applied to any optical disc device reproducing a hybrid type disc in which two or more recording layers, not limited to the HDDVD layer and the DVD layer, corresponding to different wavelengths are arranged in a laminating direction.

It should be noted that the number of recording layer corresponding to each wavelength is not restricted to one, and two or more recording layers corresponding to each wavelength may be arranged in a disc. In this case, acquisition and storing process of a lead-in information is performed to the recording layer holding the lead-in information. Acquisition and storing process of parameter value is simultaneously performed at the time of the acquisition and storing process of the lead-in information. In this case, it may not be necessary to perform acquisition and storing process of parameter value with respect to all the recording layers corresponding to same wavelength. That is, when two or more recording layers corresponding to same wavelength are arranged and a lead-in information is individually recorded on these recording layers, acquisition and storing processing of parameter value may be performed only in the time of acquisition and storing process of the lead-in information with respect to any one recording layer among these recording layers. In this case, the acquired parameter value may be used also as parameter value for other recording layer of same wavelength.

Although, in the above embodiment, both acquisition and storing process of parameter value, and acquisition and storing process of a lead-in information are performed in advance of a jump between layers, only acquisition and storing process of the lead-in information may be performed in advance of a jump between layers, and acquisition process of parameter value may be performed for every jump between layers. In this case, however, by the time when the acquisition process of parameter value is performed at the time of the jump, the time from the jump to the start of the reproduction operation becomes long.

When information indicating that the DVD layer 14 otherwise exists is included in the lead-in information of the HDDVD layer 12, based on the lead-in information of the HDDVD layer, the loaded disc may be recognized as a hybrid disc.

Although the ROM type (Read Only Memory type) disc is explained in the above embodiment, the present invention can be applied also to an R type (Recordable type) disc, and RW type (Rewritable type) disc. The present invention can be applied to the optical disc device capable of reproducing a hybrid disc having two or more recording layers corresponding to different wavelengths and two or more lead-in informations.

Although explanation is made by showing the hybrid disc having the HDDVD layer and the DVD layer in the above embodiment, the present invention is applicable also to the optical disc device dealing with a hybrid disc having two or more recording layers corresponding to different wavelengths and two or more lead-in informations, such as a hybrid disc having a Blu-ray layer and a DVD layer, or the like.

In the present invention, a hybrid disc having recording layers based on two or more kinds of formats and holding lead-in information corresponding to each format in each recording layer is assumed. According to the present invention, when reproducing such disc by jumping between recording layers, the time taken to shift to reproducing from a jump can be shortened sharply. Therefore, according to the present invention, the waiting time of a user at the time of a jump between recording layers can be shortened, and the user can be provided with a comfortable contents reproduction operation.

In many cases, lead-in information exists in the disc most inner circumference or an outermost circumference. For this reason, when a lead-in information is acquired at the time of a jump to other recording layers, it is necessary that, after the most inner circumference or an outermost circumference is once accessed, a target position (a reproduction position) is accessed. In this case, when the reproduction position after the jump is greatly distant from the record position of the lead-in information, seek time becomes quite large and, for this reason, displeasure may be given to a user. According to the present invention, since a lead-in information is not acquired at the time of a jump, such a problem can be avoided and, therefore, a user can be provided with a comfortable reproduction operation.

In addition, various changes are possible for the embodiment of the present invention within the limits of the technical scope shown in the claim.

What is claimed is:

1. An optical disc device capable of performing a reproduction process for a hybrid type optical disc having laminated two or more recording layers including a first recording layer and a second recording layer corresponding to laser beams of different wavelengths, the optical disc device comprising:

a first laser for emitting a blue laser beam used for reproducing recorded information from the first recording layer;

a second laser for emitting a red laser beam used for reproducing recorded information from the second recording layer;

an optical pickup for irradiating the hybrid type optical disc with one of the blue and red laser beams for obtaining signals from corresponding one of the first and second recording layers;

a laser drive circuit for driving selected one of the first and second lasers;

a servo circuit for controlling the optical pickup to select one of the first and second recording layers;

a demodulation circuit for demodulating the signals from the optical pickup; and a controller for controlling the laser drive circuit, the servo circuit and the demodulation circuit, the controller being programmed to first perform when the hybrid type optical disc is loaded, a reproduction process for the first recording layer before performing a reproduction process for the second recording layer, the first recording layer reproduction process being given priority over the second recording layer reproduction process, wherein when the hybrid type optical disc is loaded, the controller (1) performs a control process of acquiring first lead-in information for the first recording layer with the first laser after acquiring second lead-in information for the second recording layer with the second laser, and (2) responsive to a reproduction instruction after acquiring the first lead-in information, performs a control process of reproducing the recorded information from the first recording layer before performing the reproduction process for the second recording layer.

2. The optical disc device according to claim 1, wherein the controller performs a control process of acquiring lead-in information for all recording layers other than the first recording layer, after the hybrid type optical disc is loaded to the optical disc device and before the first lead-in information is acquired.

3. An optical disc device capable of performing a reproduction process for a hybrid type optical disc having laminated two or more recording layers including a first recording layer and a second recording layer corresponding to laser beams of different wavelengths, the optical disc device comprising:

a first laser for emitting a blue laser beam used for reproducing recorded information from the first recording layer;

a second laser for emitting a red laser beam used for reproducing recorded information from the second recording layer;

an optical pickup for irradiating the hybrid type optical disc with one of the blue and red laser beams for obtaining signals from corresponding one of the first and second recording layers the hybrid type optical disc;

a laser drive circuit for driving selected one of the first and second lasers;

a servo circuit for controlling the optical pickup to select one of the first and second recording layers;

a demodulation circuit for demodulating the signals from the optical pickup; and a controller for controlling the laser drive circuit, the servo circuit and the demodulation circuit, the controller being programmed to first perform when the hybrid type optical disc is loaded, a reproduction process for the first recording layer before performing a reproduction process for the second recording layer, the first recording layer reproduction process being given priority over the second recording layer reproduction process, wherein when the hybrid type optical disc is loaded, the controller (1) performs, responsive to a reproduction instruction after acquiring first lead-in information for the first recording layer, a control process of reproducing the recorded information from the first recording layer before acquiring second lead-in information for the second recording layer and performing the reproduction process for the second recording layer, and (2) a control process of monitoring the reproduction of the recorded information from the first recording layer so as to perform a control process of acquiring the second lead-in information when possible.

4. The optical disc device according to one of claims 1 to 3, further comprising a memory, wherein the controller performs a control process of acquiring, when acquiring the second lead-in information, a predetermined parameter value required for the reproduction process for the second recording layer, and storing the parameter value in the memory, wherein the parameter value is obtained by irradiating the second recording layer with the red laser beam, and the controller performs a control process of reading out the parameter value for the second recording layer from the memory and setting the parameter value for the reproduction process for the second recording layer, responsive to a jump instruction to jump from the reproduction process for the first recording layer to the reproduction process for the second recording layer.

* * * * *